W. GATEGAST.
METHOD OF MAKING PATTY SHELLS.
APPLICATION FILED SEPT. 26, 1911.
1,036,092.
Patented Aug. 20, 1912.
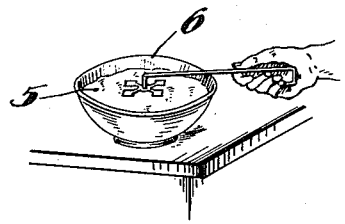
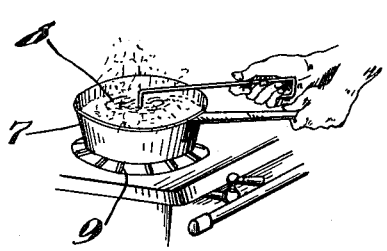
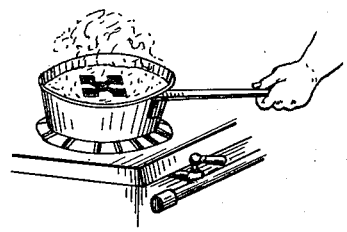
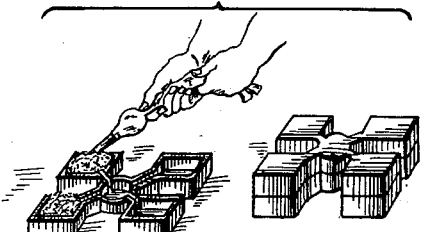
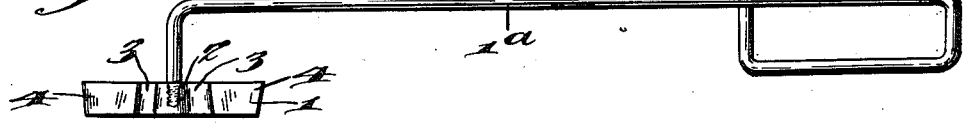
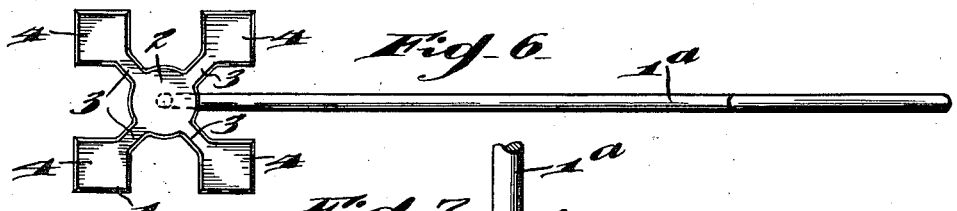
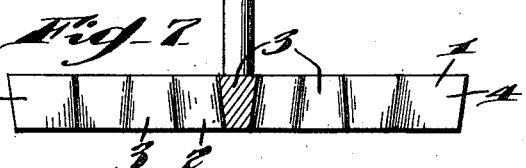
WITNESSES:
INVENTOR
William Gategast,
BY
Joshua R. H. Potts
Attorney

UNITED STATES PATENT OFFICE.

WILLIAM GATEGAST, OF PHILADELPHIA, PENNSYLVANIA.

METHOD OF MAKING PATTY-SHELLS.

1,036,092.  Specification of Letters Patent.  Patented Aug. 20, 1912.

Application filed September 26, 1911. Serial No. 651,446.

*To all whom it may concern:*

Be it known that I, WILLIAM GATEGAST, a citizen of the United States, residing at Philadelphia, in the county of Philadelphia and State of Pennsylvania, have invented certain new and useful Improvements in Method of Making Patty-Shells, of which the following is a specification.

My invention relates to improvements in method of making patty shells, the object of the invention being to provide an improved patty shell which is the result of certain improved steps in the method of making which results in a shell having its inner face thoroughly cooked by the action of boiling grease in contact therewith, as well as with the outside of the shell, said shells adapted to be used in connection with a filling and placed together.

With this object in view, the invention consists in certain novel steps in the method as will be more fully hereinafter described and pointed out in the claim.

In the accompanying drawings: Figures 1, 2, 3, and 4, illustrate in perspective the several steps in the carrying out of my improved method. Figs. 5, and 6 are views in side elevation and bottom plan of an iron which I preferably employ, and Fig. 7, is a view in section through the iron on an enlarged scale.

The iron is illustrated most clearly in Figs. 5, 6, and 7, and comprises a casting 1 and a wire handle 1ª, the latter preferably screwed into the center of the casting as shown. The particular iron illustrated is shaped somewhat like a Maltese cross. This particular shape may be varied, it being understood that the patty shell formed will be of the shape of the iron. With the particular shape illustrated, a circular center 2 is provided having four radially projecting arms 3, the latter having enlarged rectangular outer ends 4, said center, said arms, and said ends all having their side walls tapering inwardly from their upper to their lower faces to permit the patty shell to be readily shaken from the iron.

In carrying out my improved method, I provide a batter 5 in a suitable receptacle 6, and in another receptacle 7, I provide boiling fat or other similar material 8, preferably maintained in boiling condition over a burner or stove 9. The iron is first placed in the boiling grease giving to the iron its preliminary heat and greasing the surface thereof. The iron is then placed in the batter with its upper surface flush with the upper surface of the batter as shown in Fig. 1. The iron is then removed, and a thickness of batter will adhere to the sides and bottom face of the iron. The iron is next submerged in the boiling fat as shown in Fig. 2, and is shaken slightly up and down to free the batter from the iron, permitting the iron to be lifted out of the batter, leaving the latter in the boiling fat as seen in Fig. 3. The patty shell thus formed is turned about in the hot grease so that the inner surface of the patty shell will be thoroughly cooked the same as the outer surface thereof, and when thoroughly cooked the shell is removed. These shells are then ready for filling with some soft tasty material as shown in Fig. 4, and are designed to be served with two shells together, inclosing the filling.

I would have it understood that I might change the shape of the iron, so that different designs of patty shells might be made, and I might make other changes in the iron and in the method as fairly fall within the spirit and scope of the appended claim.

Having thus described my invention, what I claim as new and desire to secure by Letters Patent is:

The herein described method consisting in placing an iron in a batter, so that the batter only adheres to the sides and bottom of the iron, then placing the iron with its batter in hot grease, then shaking the partially cooked patty shell off of the iron into the grease, then turning the patty shell about in the grease until thoroughly cooked, and then removing the patty shell, substantially as described.

In testimony whereof I have signed my name to this specification in the presence of two subscribing witnesses.

WILLIAM GATEGAST.

Witnesses:
S. W. FOSTER,
C. R. ZIEGLER.